US007224259B2

(12) United States Patent
Belmond et al.

(10) Patent No.: US 7,224,259 B2
(45) Date of Patent: May 29, 2007

(54) UNLOCKING SYSTEM FOR AUTOMOBILE VEHICLE DOORS AND THE LIKE

(75) Inventors: Jean-Marc Belmond, St Jean le Blanc (FR); Frederic Burkat, Bouzy-la-Forêt (FR); Sylvain Chonavel, Sully sur Loire (FR); Yi Hwa Chu, Ouzouer sur Loire (FR); Pascal De Vries, Sandillon (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 461 days.

(21) Appl. No.: 10/365,714

(22) Filed: Feb. 12, 2003

(65) Prior Publication Data

US 2003/0155779 A1 Aug. 21, 2003

(30) Foreign Application Priority Data

Feb. 12, 2002 (FR) .................................. 02 01698

(51) Int. Cl.
*B60R 25/00* (2006.01)
*B60R 25/04* (2006.01)
*E05C 3/06* (2006.01)

(52) U.S. Cl. ...................... 340/5.72; 307/10.5; 70/256; 70/257; 292/201; 292/216

(58) Field of Classification Search ............... 340/5.72; 70/256, 257
See application file for complete search history.

(56) References Cited

U.S. PATENT DOCUMENTS 4,798,068 A * 1/1989 Nakauchi ..................... 70/276
5,497,641 A * 3/1996 Linde et al. ............... 340/5.72
5,552,641 A 9/1996 Fischer et al.
5,602,426 A * 2/1997 Ecker ........................ 340/5.72

(Continued)

FOREIGN PATENT DOCUMENTS

| | | | |
|---|---|---|---|
| DE | 19600524 | A1 | 6/1997 |
| DE | 100 48 709 | | 4/2002 |
| EP | 1 001 118 | | 5/2000 |
| EP | 1050643 | A | 11/2000 |
| EP | 1052353 | A1 | 11/2000 |
| WO | WO 0123695 | A | 4/2001 |

OTHER PUBLICATIONS

Search report, dated Nov. 4, 2002.
European Search Report dated Dec. 15, 2003.

*Primary Examiner*—Wendy B. Garber
*Assistant Examiner*—Clara Yang
(74) *Attorney, Agent, or Firm*—Carlson, Gaskey & Olds

(57) ABSTRACT

A system for unlocking a key cylinderless automobile vehicle door includes a portable object having an identifier and a circuit for interrogating the object. The circuit powers the object and interrogates the object when it is outside the vehicle. The interrogating circuit supplies a signal authorizing unlocking of the door as a function of the identifier. A standby power supply, which is separate from the main power supply of the vehicle, also powers the circuit and the object. As a result, the vehicle door does not require a key cylinder while still ensuring unlocking even if the main power supply of the vehicle fails.

20 Claims, 6 Drawing Sheets

U.S. PATENT DOCUMENTS 5,682,135 A * 10/1997 Labonde .................... 307/10.2
6,056,076 A 5/2000 Bartel et al.
6,056,334 A 5/2000 Petzold et al.
6,102,454 A * 8/2000 Weyerstall .................. 292/201
6,480,117 B1 * 11/2002 Flick .......................... 340/5.2
6,523,376 B2 * 2/2003 Baukholt et al. ............. 70/256
6,577,226 B1 * 6/2003 Steiner ...................... 340/5.72
6,914,346 B2 * 7/2005 Girard ....................... 307/10.1

* cited by examiner

UNLOCKING SYSTEM FOR AUTOMOBILE VEHICLE DOORS AND THE LIKE

REFERENCE TO RELATED APPLICATIONS

This present invention claims priority to French Patent Application No. 02 01 698, filed Feb. 12, 2002.

Technical Field

The present invention relates to automobile vehicle locks, and more specifically to electrically-powered automobile vehicle locks.

BACKGROUND OF THE INVENTION

Vehicle locks are used to keep an automobile vehicle door in the closed position. For purposes of this application, the word "door" should be interpreted to extend to any vehicle closure, such as a door, a trunk, a lift gate, etc. The locks allow the door to be opened by operating an internal or external manipulator, such as a key, linked to the lock and operable by a user. Typically, the locks are mounted in the vehicle door and include a claw mechanism designed to release or engage a cooperating means with respect to the lock to unlock and lock the door, respectively. The claw mechanism is urged into its closing position by the cooperating means when the door is closed. A pawl prevents the claw from returning to its release position and keeps the lock in the closed position if the lock is not subject to any release action by, for example, a release control. A vehicle will have both internal and external release controls, such as actuatable door handles.

The lock includes an internal or external release lever to connect the lock to a corresponding internal or external release control. Locking the lock prevents the lock from being opened through actuation of the external release control, while unlocking the lock allows the lock to be opened when the external release control is actuated. In the case of an automobile vehicle door, these operations are conventionally performed using a fascia pull or electromechanical actuator. For mechanical locking, generally, it is necessary to provide a linkage between the lock and a key cylinder.

Using a key cylinder raises several following problems, however. A key cylinder represents a considerable architectural constraint: the introduction of an object into the window seal can allow a thief to act on the lock-key cylinder linkage to break into the vehicle. This problem may be resolved by bringing the key cylinder and lock closer together, but this solution imposes a constraint on the relative position of the key cylinder and the lock. The problem may also be resolved by providing a linkage between the key cylinder and the lock that resists manipulation through the window seal, but this constrains the linkage movement. The position of the key cylinder is also constrained by the need to ensure that the key cylinder does not block the path of the window glass when it is lowered into the door.

The presence of a key cylinder also creates a mechanical constraint. One way of breaking into a vehicle involves tearing the key cylinder from the vehicle door. This is sometimes solved by strengthening the sheet-metal of the door around the lock area, but this adds weight and bulk to the vehicle door. In all of the cases described above, the keys employed in vehicle locks can be easily copied, further adding potential security problems.

Electronic remote controls are known ways to lock and unlock vehicle doors.

Remote controls are usually battery-powered and operate at high frequencies, such as 315, 433 or 865 MHz. Remote opening systems can operate over ranges on the order of 10 m and are usually supplemented by conventional locks to ensure that locking is always possible even if the remote control or its receiver should fail.

One vehicle, the Peugeot 406, has a key that includes a transponder (a passive circuit) that is remotely powered and can be remotely interrogated. The circuit that powers and interrogates the transponder is disposed in the vehicle and prevents the vehicle from starting if the transponder is not responding. In this application, the power feed and disabling circuit is designed to interrogate the transponder when the key is close to the vehicle steering wheel. The circuit operates at frequencies around 125 kHz, i.e., low frequencies, with a range on the order of 5 cm.

French patent 2,740,501 discloses a hands-free system for unlocking and/or opening an automobile vehicle trunk. One or two antennae are provided on the vehicle. Presenting a transponder to the antenna or antennae in a predetermined sequence causes unlocking and/or opening of the trunk. The system disclosed in this patent requires powering by the vehicle battery to achieve unlocking and opening and consequently requires the vehicle to be provided with a cylinder lock as a backup should the hands-free system fail.

U.S. Pat. No. 5,134,392 discloses a keyless opening system. The opening system employs a transmitter powered by a long-life battery.

There is considerable resistance in the art against eliminating the mechanical key cylinder, which makes opening the vehicle possible even if the radio control should fail.

European Patent Application 0,694,644 discloses an electrically-released automobile vehicle lock. Lock opening is provided electrically by operating an actuator powered by the vehicle battery. A standby power source, such as a standby battery, is built into the door associated with the lock. If the electrical power supply from the vehicle battery fails, the lock can still be opened using electrical power supplied by the standby battery. This document says nothing about employing a key cylinder in its system.

This proposed solution poses a problem with the proper dimensions of the lock opening because the motor should allow the lock to be released under both normal conditions and degraded (e.g., post-impact) conditions. The motor and its speed reduction gear are therefore designed to allow opening under degraded conditions, leading to both electrical and mechanical over-dimensioning with respect to requirements under normal conditions. Motor dimensioning consequently presents a problem for standby powering because motor should be supplied with the energy needed for release under heavy loads, but this amount of energy is excessive and wasteful for normal operating conditions.

U.S. Pat. No. 5,552,641 and European Patent Application 1,052,353 disclose locking systems for automobile vehicles based on portable transponders. These documents do not discuss what type of lock is employed in the vehicle. International Application WO-A-0123695 discloses a transmitter for operating a vehicle locking system. Contacts are provided on the transmitter as a way of overcoming failure of the transmitter or vehicle battery.

Other documents disclose locks with electrical or mechanical releases, including European Patent Application 0,589,158, European Patent Application 0,828,049, German Patent Application 196 00 524 and International Application WO-A-01/66889.

There is consequently a need for an automobile vehicle unlocking system that overcomes the disadvantages of purely mechanical locking systems and avoids the architectural and mechanical constraints caused by mechanical systems.

SUMMARY OF THE INVENTION

The present invention is a system for unlocking a key cylinderless automobile vehicle door or other vehicle closure. The system comprises an electric lock with mechanical release means able to be enabled and disabled, a portable object having an identifier, a circuit for interrogating the object, adapted to power the object and interrogate the object when it is outside the vehicle, and adapted to supply a signal to the lock authorizing the vehicle door to be unlocked as a function of said identifier.

The signal supplied under normal conditions can be a software unlocking signal for electrical release of the lock. The signal supplied under conditions where the vehicle power supply has failed is preferably a signal for enabling mechanical opening of the lock.

The interrogating circuit preferably powers the portable object remotely upon interrogation. The portable object can have contacts and the interrogating circuit can have corresponding contacts adapted to be coupled to the contacts of the portable object.

The system can have a standby power supply separate from the main power supply of the vehicle, and the interrogating circuit can be powered by the standby power supply.

The system preferably comprises an unlocking mechanism receiving an unlocking signal originating from the interrogation circuit. The unlocking mechanism can be linked to the standby power supply.

The system preferably comprises standby electronic circuitry powered by the standby power supply and adapted to enable mechanical release of the lock. The standby electronic circuitry can have a low-power mode that terminates upon reception of a signal from a sensor detecting operation of an inner lock release control or an external lock release control.

The system can further comprise an electrically releasable lock with a mechanical release that can be enabled by the action of the unlocking mechanism.

Other characteristics and advantages of the invention will become more clear from the description that follows given by way of example and with reference to the attached drawings.

DETAILED DESCRIPTION OF PREFERRED EMBODIMENTS

The invention involves the use of a portable object that is powered upon interrogation for releasing a lock of an automobile vehicle door or a similar structure. The portable object is interrogated by an interrogating circuit that is typically mounted in the vehicle door. The interrogating circuit can interrogate the object while the portable object is outside the vehicle and additionally furnish electrical power to the portable object. If the results of the interrogation indicate that the portable object is authorized to release the vehicle lock, the circuit supplies the lock on the door with a signal authorizing release of the lock.

The use of such a portable object and an associated interrogating circuit for commanding release of a lock avoids requiring a key cylinder in a vehicle door, thereby avoiding the architectural and mechanical constraints caused by key cylinders.

The lock is an electric lock with a mechanical release that can be enabled with the electric lock. Under normal operating conditions, when the vehicle battery is supplying sufficient power, the lock can be used purely as an electric lock. However, in the case of power failure, the mechanical release can be enabled using reduced power. This reduces the electric power needed to overcome the failure.

The system of the invention overcomes possible failure of the portable object's power supply because the interrogating circuit is adapted to power the object when the object is outside the vehicle. The system of the invention also resists failure of the vehicle power supply because of its ability to enable mechanical release of the electric lock. A low-power source in the door is sufficient to allow enabling of the mechanical release. Alternatively, mechanical release can be enabled permanently in the system, as explained with reference to FIG. 6.

Figure 1:
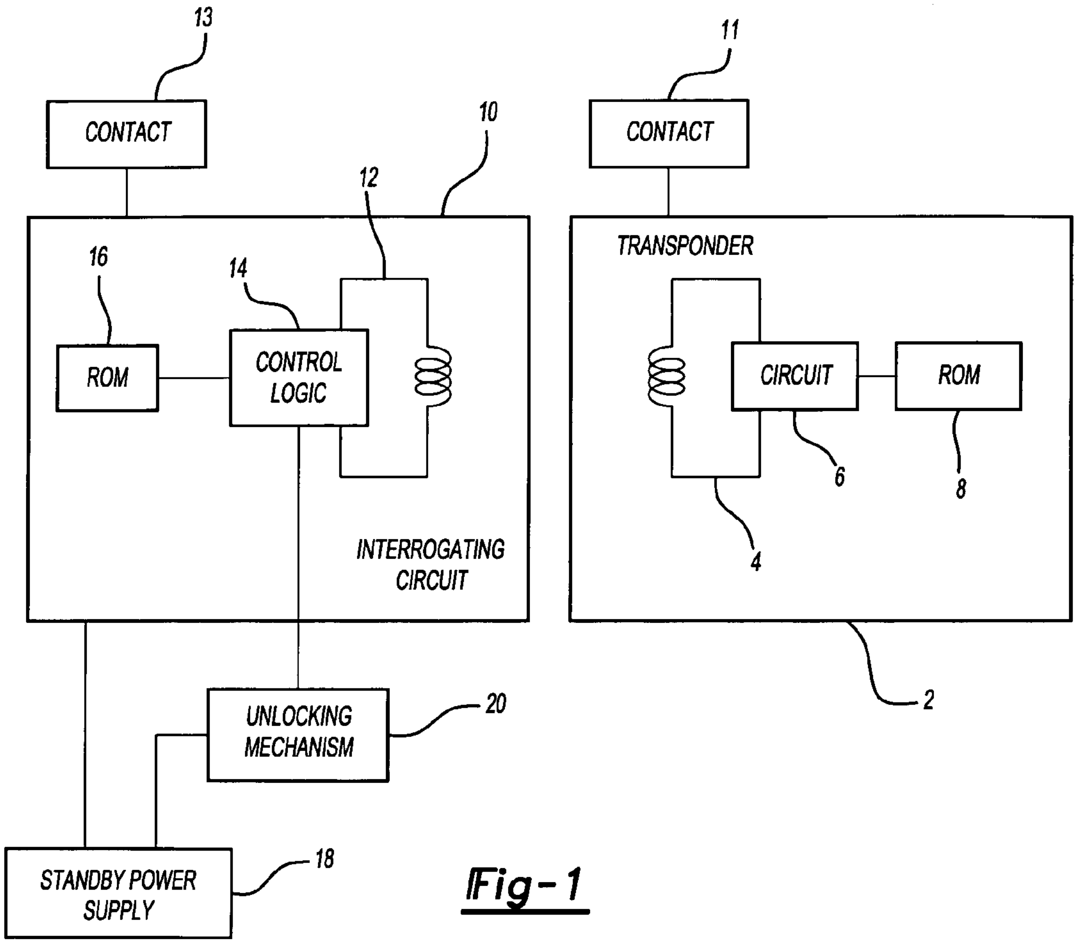
FIG. 1 is a block diagram of the various parts of the system according to one embodiment of the invention.

FIG. 1 is a block diagram of the various elements of a system according to one embodiment of the invention. A portable object 2 is powered upon interrogation by an interrogating circuit 10 and is thus able to respond to interrogation from the interrogating circuit 10. As a result, the object 2 can respond to interrogation from the interrogating circuit 10 that is powering the object 2 without requiring the object 2 to have its own separate power supply. Powering of the portable object 2 can be done remotely, i.e. without contact. One solution is to employ a transponder having a coil 4 that powers the object 2 via a magnetic field and that transmits a response to the interrogating circuit 10. FIG. 1 shows a transponder with a coil 4 for a circuit 6 powered by the coil 4 and adapted to short-circuit the coil 4 for transmitting a response. The transponder can be remotely powered and interrogated at low frequencies (e.g., at a frequency of 125 kHz).

The portable object 2 can also be powered by contact between corresponding contacts 11, 13 on the object 2 and the interrogating circuit 10, respectively. In this case, interrogation can now be advantageously achieved by modulating the power supply voltage, which can limit the number of contacts. The object 2 could therefore be in the form of a card that is introduced into a slot located, for example, between a vehicle door and the door frame to provide contact between the contacts 11, 13. This card reading position would allow the power supply and/or interrogation contacts of the card to be protected.

The portable object 2 has a ROM 8 or other memory, which is reprogrammable and particularly designed to store an identifier even when the object 2 is not powered. The identifier uniquely characterizes the object 2. The use of such an identifier stored in the memory 8 provides more possible combinations than the possible mechanical combinations of a physical key, enhancing security. Thus, for example, an identifier stored on 15 bits will provide more than 60,000 combinations, while the number of possible combinations for a mechanical key is on the order of 3000 combinations.

The memory 8 is connected to circuit 6 to allow transmission of the identifier from the portable object to the interrogating circuit when the circuit 6 is interrogated. From this point of view, any known suitable interrogation protocol (e.g., rotating codes) can be used to provide encryption of the transmitted data. For example, arrangements can be made for temporarily or definitively blocking a vehicle door upon receiving N incorrect codes.

Note that FIG. 1 is a representative view for illustrative purposes only; thus, the distinction between circuit 6 and memory 8 in the portable object 2 has only been provided for clarity. The circuit 6 and the memory 8 can be implemented in a single component without departing from the scope of the invention. It is also possible for the portable object to have functions in addition to the remotely-powered circuit 6, such as a controlling function provided by a cell or battery power supply and a high frequency transmission circuit. In this case, the circuit 6 could be powered by the cell or battery under normal running conditions and be powered only by the interrogating circuit if the cell or battery fails.

In addition to the portable object 2, the system has an interrogating circuit 10 provided on the vehicle. This circuit 10 ensures that the portable object 2 is powered when interrogated. In the case of the transponder in FIG. 1, powering is provided via a power source 12, such as an antenna, which transmits a magnetic field used for powering the coil 4 in the object 2 and is modulated for interrogation. More than one antenna could be provided.

The power supply 12 is controlled by control logic 14 that controls powering of the portable object 2 during interrogation, the interrogation itself, and the responses furnished by the object 2. Depending on the response from the object 2, the control logic 14 may deliver a locking release signal. In one simple case, a memory 16 is provided for storing an identifier. Interrogation of the portable object 2 involves comparing the identifiers in memories 8 and 16. The control logic 14 then issues the locking release signal if the comparison shows that the identifiers are identical.

It is also advantageous for the interrogating circuit 10 to be powered by a standby power supply 18 that is separate from the main power supply of the vehicle. The standby power supply 18 can be a cell, battery, super-capacitor or similar device and is used to overcome failure of the main supply of the vehicle. One can also obviously provide for the circuit 10 to be powered from the main supply of the vehicle or for the standby power supply 18 to only be used as a standby source should the main power supply fail.

FIG. 1 also shows an unlocking mechanism 20 for releasing the lock of the vehicle door. In one embodiment, the unlocking mechanism 20 receives a release signal from the interrogating circuit 10 and proceeds with releasing the lock of the door upon reception of the locking release signal. In FIG. 1, it can be seen that the unlocking mechanism 20 is powered by a power supply 18, at least in standby mode. Again, powering of the unlocking mechanism 20 separately from the vehicle main power supply ensures that locking release is possible even if the vehicle's main supply is faulty.

To ensure that the standby power supply 18 is easily manufactured, compact and inexpensive, the unlocking mechanism should have limited power consumption. A first solution involves using an electromechanical lock in which a specific motor provides lock release. In this case, the lock release motor is typically a 6 volt motor with an electric power of 10 W. According to the invention, an electric lock can be used with a mechanical release that can be enabled with the lock. Such a lock is described below with reference to FIGS. 2–5 and is described in more detail in commonly-assigned, co-pending applications entitled "Automobile Vehicle Lock," U.S. application Ser. Nos. 10/365,024 and 10/365,010 which are incorporated by reference herein. In this case, the lock release signal initiates enablement of a mechanical release so that the door can be opened mechanically using the handle. FIG. 6 shows a further example of a lock which is opened electrically with a mechanical release that can be enabled, which can also be used in the inventive system.

In both cases, the standby power supply 18 can take the form of a cell, battery, or capacitor supplying a voltage of up to 6 V. This value provides operation of the unlocking mechanism 20, powering upon interrogation, and interrogation of the portable object 2.

The physical positions of the interrogating circuit 10, power supply 18 and unlocking mechanism 20 can vary in the vehicle. The only constraint is that the interrogating circuit 10 should be able to supply the portable object 2 with power and be interrogated while the portable object 2 is outside the vehicle. For interrogating a transponder, it is sufficient for the interrogating circuit 10 to be on any non-metal part of the vehicle, such as a door handle, a door surround trim, a protective trim, a rear view mirror shell, an optical device, etc. Other locations, such as the door seal mentioned above, may be preferred for other types of interrogating circuits 10.

Other factors may also be considered in positioning the system components. For example, it is appropriate to provide the wiring between the interrogating circuit 10 and the unlocking mechanism 20 and, if appropriate, to provide the wiring of these two components from the standby power supply 18. It is advantageous from this point of view to place the various components as close together as possible. This favors installation of the various parts of the system in the door.

Installation of the various parts of the system in the door, which is a closed element, further increases security. In such an installation, a break in a circuit at the door for separately powering the unlocking mechanism 20 or for isolating interrogating circuit 10 does not adversely affect door locking operation. More particularly, a break in the door wiring would not prevent either interrogation or release of the lock.

The interrogating circuit 10 can also be part of the main door electronics while still preserving a separate standby power supply 18. This solution makes it possible to dispose of information for controlling lock release, notably in emergency situations. Conversely, if wiring to the other vehicle doors is provided, it may be advantageous to put the interrogating circuit 10 at a central position to limit the total amount of wiring in the vehicle.

The system described with reference to FIG. 1 has the following advantages. It makes locking release possible even if the main supply of the vehicle fails. In view of the very high degree of reliability due to the presence of the standby power supply, it is possible to eliminate the key cylinder on the lock, removing constraints on door design and limiting the possibility of vehicle break-ins through the key cylinder.

FIGS. 2 through 6 illustrate one embodiment of the inventive lock, which has an electrical lock release as well as a mechanical release that can be enabled. Mechanical release can be enabled via the interrogating circuit 10 to allow the door to be opened even if the main electrical supply of the vehicle has failed.

In the following description, the terms vertical, horizontal, left, right, top and bottom refer to the position of the lock shown in the figures. The positions described are for illustrative purposes and should not be understood as limiting the position of the lock in operation.

Figure 2:
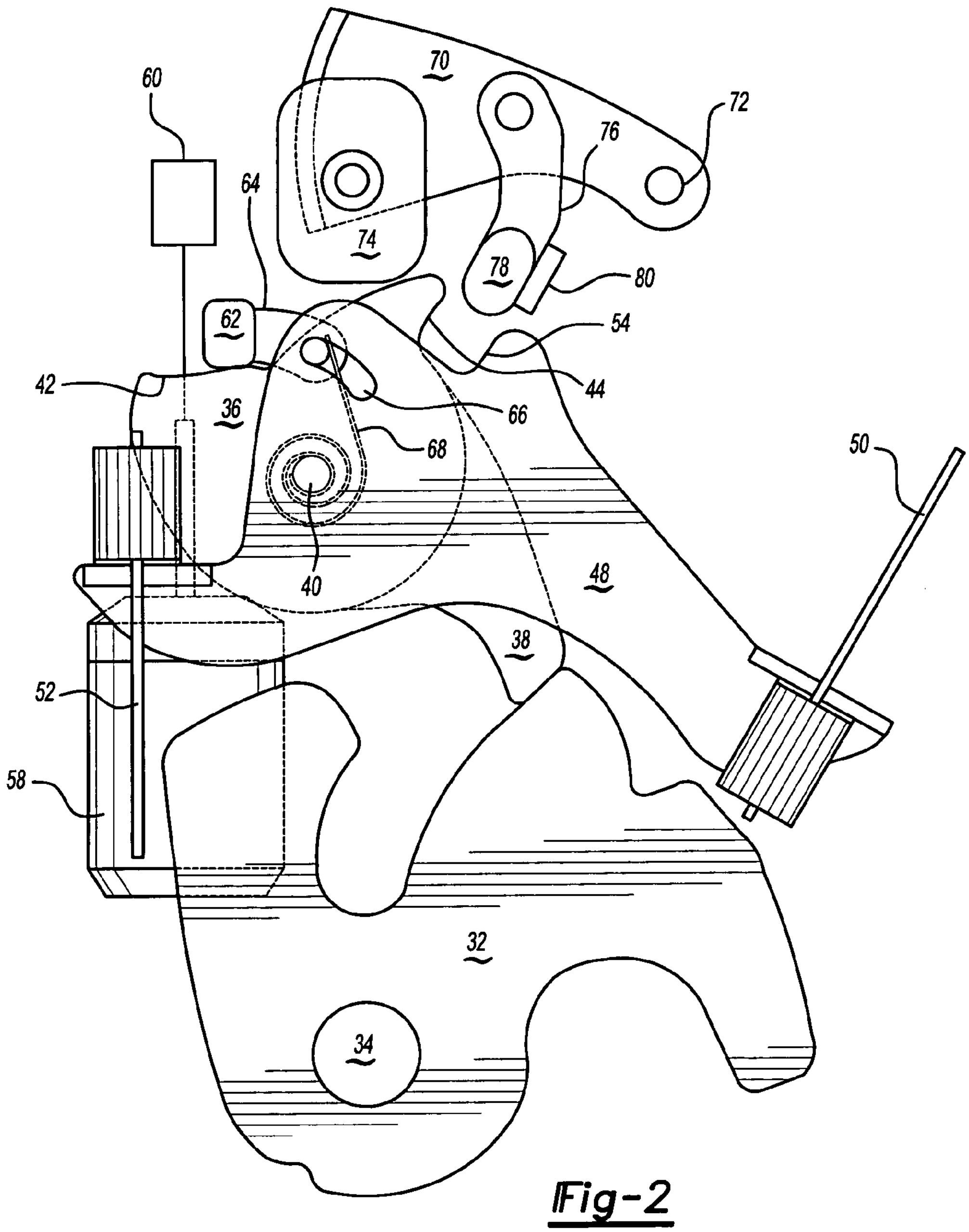
FIG. 2 is a diagrammatic view of a lock that can be used in the inventive system, where the lock is in a closed position and mechanical release is not enabled.
Figure 3:
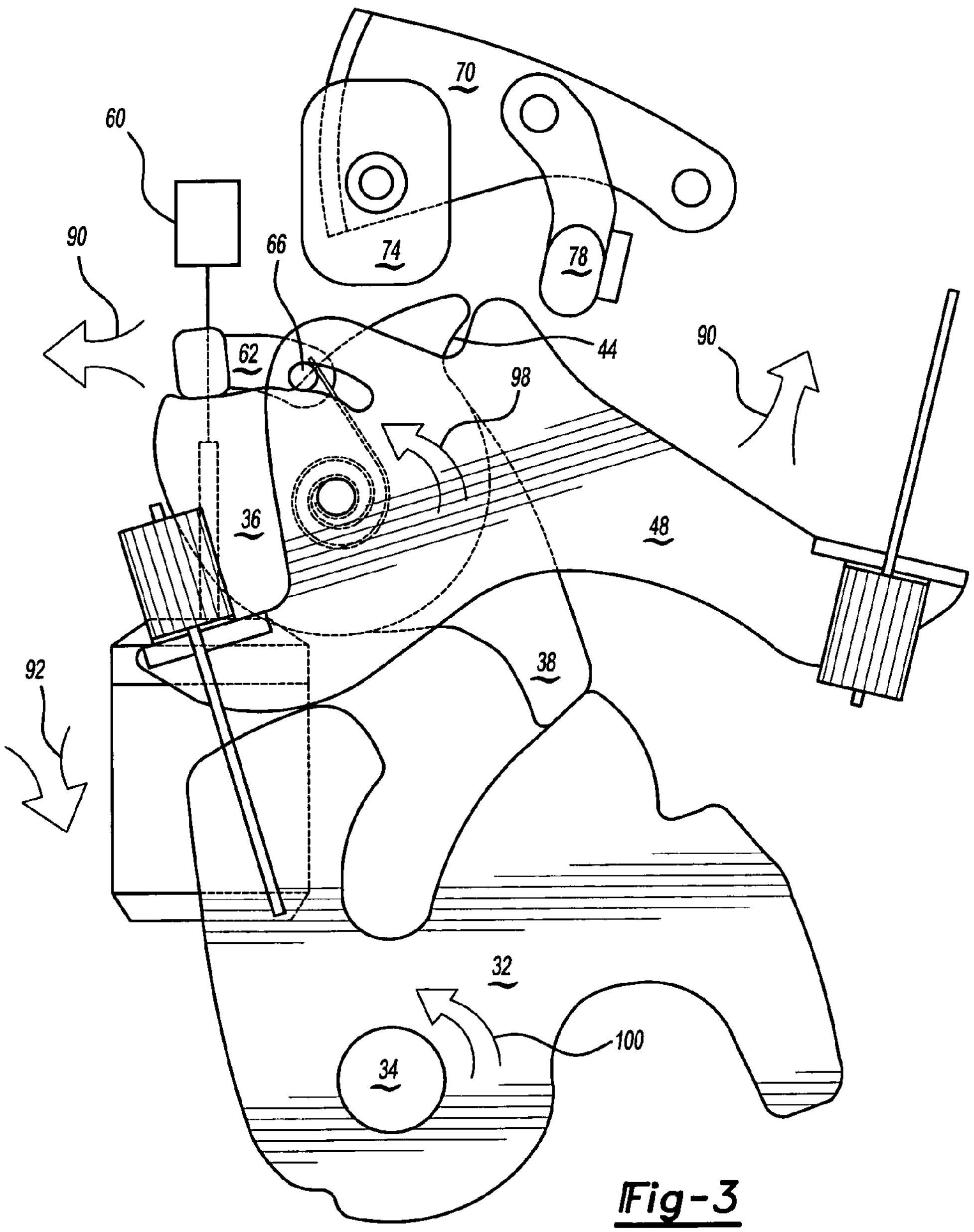
FIG 3 shows the lock of FIG. 2 in an electrical release position.

FIG. 2 is a diagrammatic view of a lock in a closed and locked position according to an embodiment of the invention. FIG. 2 shows the claw 32, which is mounted rotatably about axis 34. Rotation of the claw 32 about the axis 34 in a counter-clockwise direction allows the door to be opened as shown in FIG. 3 or 5. The claw 32 is biased clockwise by a spring towards its open position.

For the claw 32 shown in FIG. 2, the pawl 38 prevents the door from releasing and keeps the claw 32 on a cooperating means (not shown) holding the door in place. The exact shape of the claw 32 and its movement are known and will therefore not be described in detail. The claw 32 and the claw movement can be modified without affecting the operation of the lock.

FIG. 2 further shows a pawl lifter 36 and the pawl 38. The pawl 38 and pawl lifter 36 rotate about an axis 40. The pawl 38 and pawl lifter 36 can be better seen in FIG. 3 and have, in one embodiment, an integral construction. Counter-clockwise rotation of the pawl lifter 36 and the pawl 38 about the axis 40 allows the claw 32 to rotate counter-clockwise, consequently opening the lock.

FIGS. 3 and 5 show the pawl 38 and pawl lifter 36 in the foreground. The pawl lifter 36 has a substantially circular shape with a first bearing surface 42 and a second bearing surface 44. Abutment against either one of these bearing surfaces causes the pawl 38 to turn counter-clockwise. The pawl 38 is integral with the pawl lifter 36 and is rotatably driven by the pawl lifter 36 when the pawl lifter 36 turns counter-clockwise. The pawl 38 has a finger portion 46 that contacts the claw 32, preventing the claw 32 from moving when the lock is closed and locked, in the position shown in FIG. 2. Movement of the finger portion 46 allows the claw 32 to rotate, as shown in FIGS. 3 and 5. The pawl 38 and pawl lifter 36 are biased by a spring (not shown) toward the closed and locked position shown in FIG. 2.

A lever 48 for manually or mechanically opening the door (visible in FIG. 2) is rotatably mounted about the axis 40 of the pawl 38. The lever 48 is connected by an external release cable or rod mechanism 50 to an external release control (not shown). The lever 48 is connected by an inside release cable or rod mechanism 52 to an internal release control (not shown). Operating the external release control or the internal release control brings about rotation of the lever 48 about the axis 40 in a counter-clockwise direction via the cable or rod mechanism 50 or the cable or rod mechanism 52, respectively. The lever 48 also has a bearing surface 54 for driving the pawl lifter 36 when mechanical release of the lock is selectively engaged, as explained below with reference to FIGS. 4 and 5. The lever 48 further has an opening 56, which will be explained in greater detail below. A spring (not shown) biases the lever 48 counter-clockwise to the closed position shown in FIG. 2.

A motor 58 for electrically opening the lock can be seen in FIG. 2. The motor 58 drives a drive arm 60 in translation along a vertical axis in FIG. 2. The motor 58 is electrically powered from the main electrical circuit of the vehicle and is dimensioned to ensure release of the door lock under normal operating conditions. The motor 58 can typically consist of a DC motor of, for example, 40 watts with a no-load speed on the order of, for example, 12,500 rpm.

The lock has a release coupling lever 62 to allow release of the lock. The release coupling lever 62 is mounted at an end of an arm 64. The other end of the arm 64 carries a lug 66 that engages in the opening 56 of the lever 62 discussed above. A spring 68 biases the arm 64 to the left in FIG. 2. In the position in which the lock is locked shown in FIG. 2, when the lever 48 is in the rest position, the lug 66 bears against the left-hand end of the opening 56 under the biasing action of the spring 68. The arm 64 and the release coupling lever 62 are then brought back toward the right by the lever 62 to clear the first bearing surface 42 of the pawl 38 and the drive arm 60.

In this position, powering of the motor 58 and movement of the drive arm 60 do not allow the pawl to turn. The release coupling lever 62 consequently provides security against accidental release should motor 58 be accidentally powered.

When the inner or external release control is operated, the lever 48 rotates about axis 40 counter-clockwise as shown in FIG. 3. In this position, the spring 68 biases the arm 64 to the left, and the release coupling lever 62 adopts a position between the first bearing surface 42 of the pawl lifter 36 and the operating arm 60. In this position, as explained below, the release coupling lever 62 enables the motor 58 to be powered by closing a contact; its position between the drive arm 60 and the first bearing surface 42 of the pawl 38 allows the door to be opened by powering the motor 58.

If the motor 58 does not operate correctly and if the drive arm 60 moves toward the first bearing surface 42 of the pawl lifter 36 and jams in this position, the opening 56 in the lever 48 still allows the lever 48 to turn. Indeed, if the lever 48 turns, the release lever 62 comes into contact with the arm 60 and its movement becomes blocked. The lever 48 can continue to turn, with the lug 66 moving inside the opening 56 against the bias of spring 68. The opening 56, the spring 68 and the lug 66 consequently provide a safety measure against faulty operation of motor 58. This flexible linkage between the release lever 62 and the lever 48 for manually opening the door prevents the lock from jamming if the motor fails when the arm is in the lower position.

Figure 4:
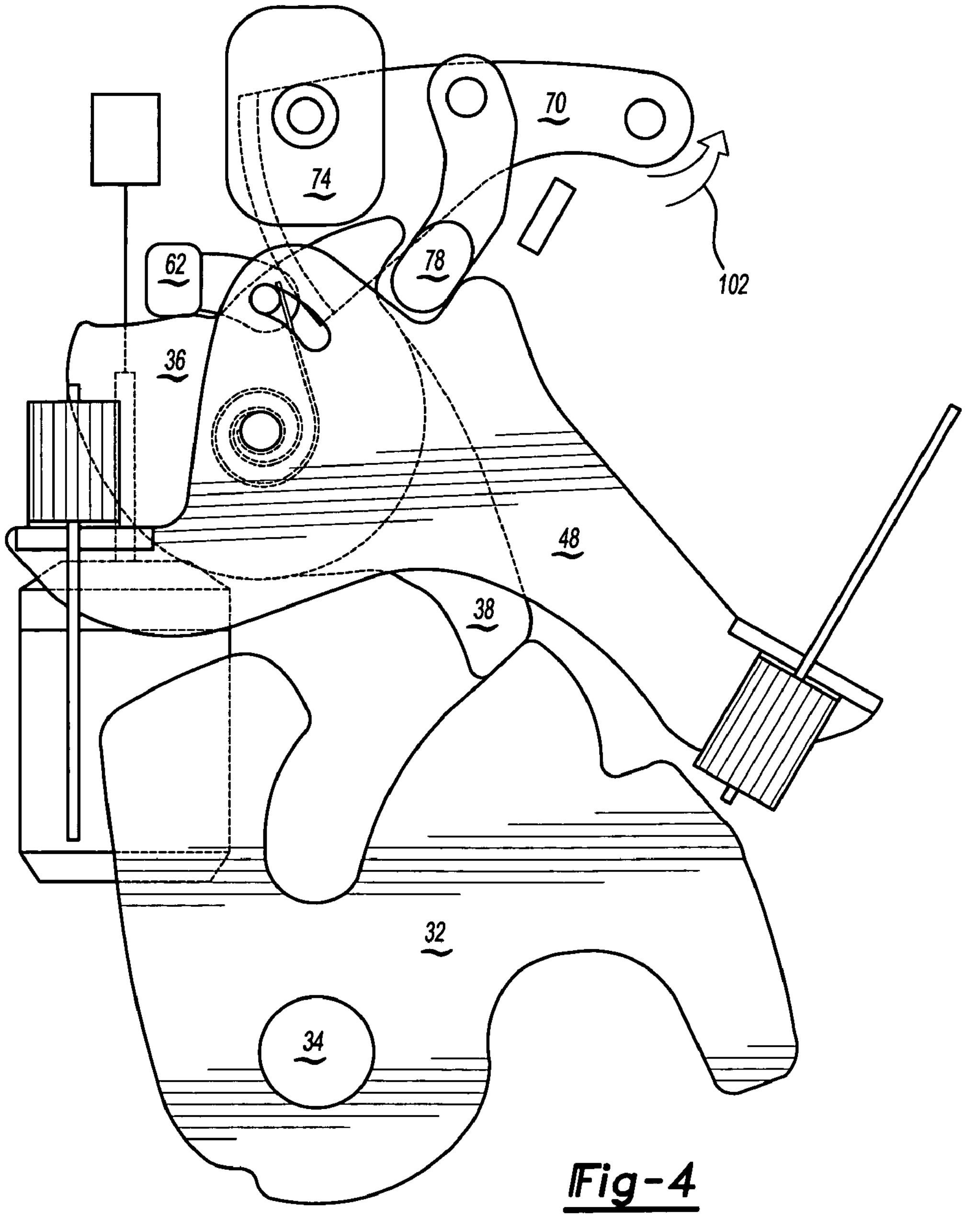
FIG. 4 shows the lock of FIG. 2 in a closed, unlocked position, allowing mechanical opening.
Figure 5:
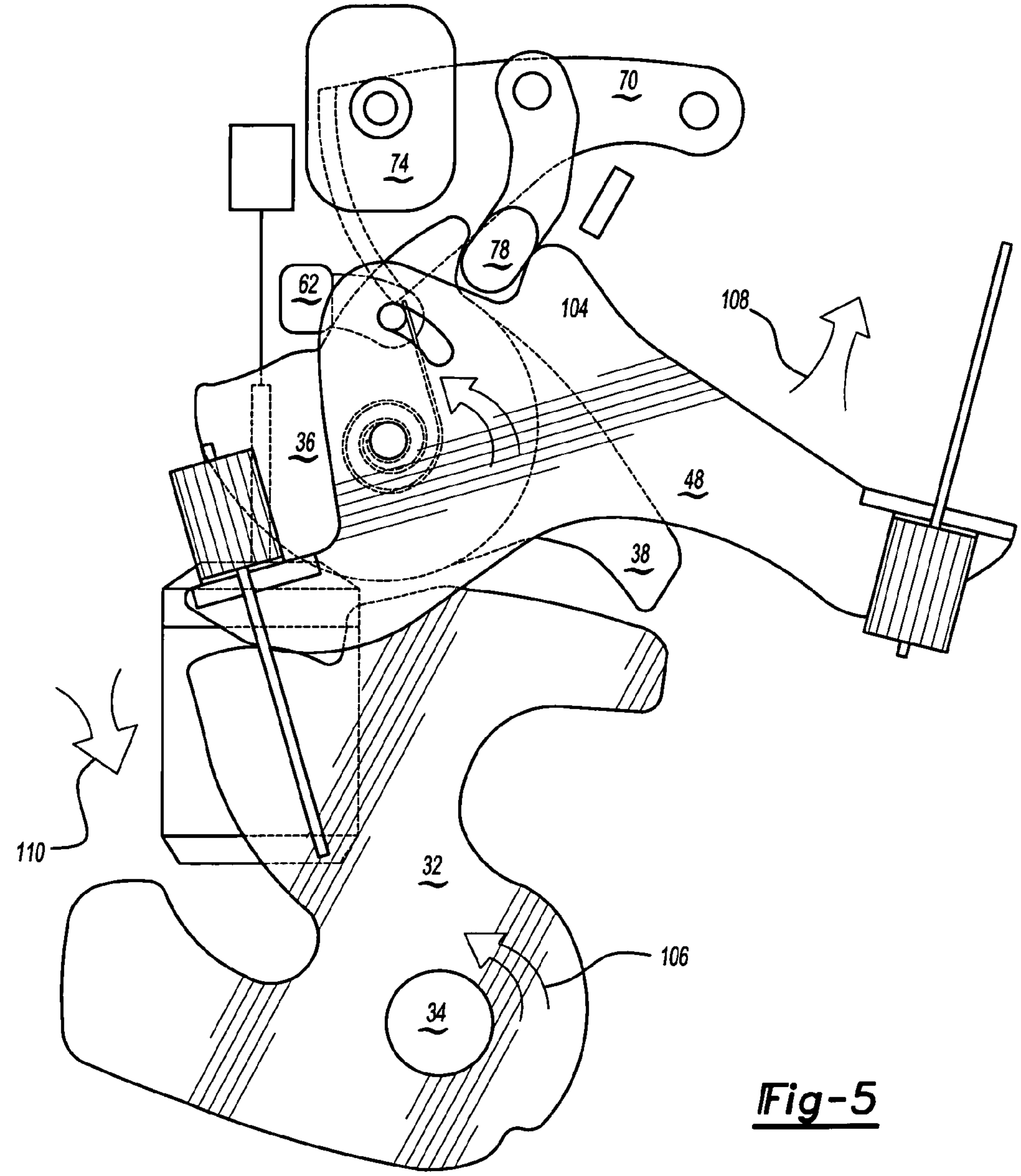
FIG. 5 shows the same lock in a mechanical release position after release of the lock shown in FIG. 4.
Figure 6:
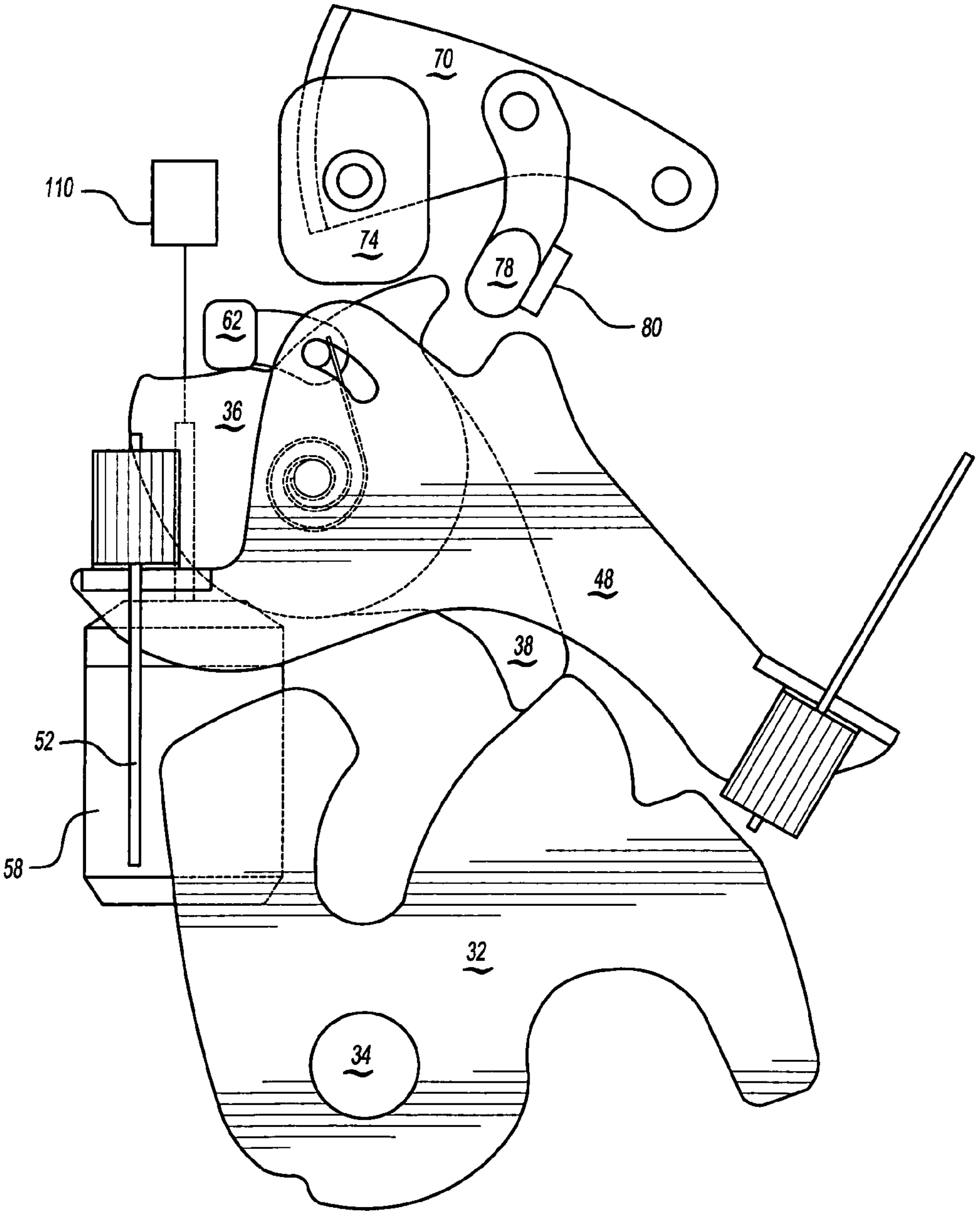
FIG. 6 is a diagrammatic view of another lock that can be used in the system of FIG. 1 in a closed position, where the emergency mechanical release is not enabled.

Finally, the cylindrical or rounded shape of the release lever 62 facilitates its release under the effect of the recall spring for lever 48 if the drive arm 60 jams in the position shown in FIG. 4 or 5. Releasing the release lever 62 avoids, in this case, the lock getting jammed in an open position.

FIG. 2 shows elements of the selective coupling mechanism for mechanically opening the lock. This mechanism comprises an arm 70, which is rotatably mounted about an axis 72. Movement of the arm 70 about the axis 72 is controlled by a standby motor 74 operating under very low load. The motor allows the arm 70 to turn in one direction or the other for reasons explained below. A selective mechanical coupling finger is mounted on arm 70. When the standby motor 74 causes the arm 70 to rotate counter-clockwise, the end 78 of the finger 76 moves between the bearing surface 54 of the lever 48 and the second bearing surface 44 of the pawl lifter 36. Reference numeral 80 indicates a member for guiding the end 78 of the finger 76. The finger 76 is rotatably mounted on the arm 70 and its end 78 can turn about the axis 40 at the same time as the lever 48 and pawl lifter 36.

Electrical contacts may be provided for operating the lock. A first contact is provided at the external release control and is operated when the user manipulates this control. As explained above, a second contact is operated by the release coupling lever 62, enabling lock release when it becomes inserted between arm 60 and the first bearing surface 42 of the pawl. In one embodiment, a "door open" contact has a state representing the open or closed state of the door.

Under normal conditions, operation of the lock is as shown in FIG. 3. This diagram shows how the lever 48 moves if the external or inner release control is operated. The external and inner release controls are similar; the operation of the inner release control is shown in parentheses in the following description. The cable or rod mechanism 50 (or the cable or rod mechanism 52) transmits this manipulation of the release control to the lever which turns about second axis 40, as shown by arrow 90 (or 92). Under the effect of rotation of the lever 48, the release coupling lever 62 is driven to the left from the position shown in FIG. 2. As shown by arrow 94, the release coupling lever 62 gets positioned between the arm 60 and the first bearing surface 42 of the pawl lifter 36. At the end of the travel of the release coupling lever 62, the lever 62 operates the second contact.

FIG. 3 again shows the movement of arm 60 under the action of motor 58. On FIG. 3, to clarify the description, lever 48 is shown behind the pawl 38 and pawl lifter 36. Operation of the second contact by the release coupling lever 62 energizes motor 58, which drives arm 60 towards release coupling lever 62 and the first bearing surface of the pawl lifter 36, as illustrated by arrow 96. Under the effect of the drive force of the motor 58 transmitted by arm 60 and release coupling lever 62, the pawl 38 and pawl lifter 36 are driven counter-clockwise around the second shaft 40; this rotary movement is shown by arrow 98 on FIG. 3.

At the end of the lock release movement, the pawl 38 and pawl lifter 36 turn as shown by arrow 98 and allow the claw 32 to turn. Under the effect of the reaction force of the seal, to which the vehicle door responds, the latter turns counterclockwise, as shown by arrow 100, and releases the closing cooperating means mounted on the vehicle. The door will then open.

Once the door has opened, the "door open" contact changes state. The motor 58 is controlled to bring the arm 60 back to a raised position and the release coupling lever 62 is released. The lever 48 returns to the position of FIG. 2 when the external release control is no longer applied. The pawl 38 is biased back to the position shown in FIG. 2 so that closing the door brings the claw 32 and pawl 38 back to the position shown in FIG. 2.

FIGS. 4 and 5 are views of the lock of FIG. 2 and illustrate how the various parts of the lock move during mechanical release of the lock. Mechanical release is commanded by a locking release signal delivered by the circuit 10 when the electrical supply of the vehicle is faulty.

FIG. 4 is a view of the lock after powering the standby motor 74 to selectively establish coupling for mechanically opening the lock. As shown in FIG. 4, operating the standby motor 74 causes the arm 70 to rotate about the axis 72 in a counter-clockwise direction as shown symbolically in FIG. 4 by arrow 102. As a result of this rotation, the mechanical release coupling lever 62 moves towards the lever 48 and the pawl lifter 36. The presence of the guide member 80 helps ensure that the end 78 of the finger is inserted between the bearing surface 54 of the lever 48 and the second bearing surface 44 of the pawl lifter 36. In the position shown in FIG. 4, the lock is enabled with the mechanical release of the lock by operating the inner or external release control, independently of operation of the motor 58, as explained with reference to FIG. 5.

It will be understood that the standby motor 74 is simply dimensioned to allow rotation of arm 70 and movement of finger 76. Because of this, the standby motor 74 can be dimensioned for low loads. In one embodiment, a 10 W DC motor can be used as the standby motor 74 with a no-load speed on the order of 4000 to 6000 rpm. "Power," as used herein, is the simple product of nominal voltage and the start-up current of the motor and is not representative of the mean power consumed by the motor (the energy consumed by the motor while arm 70 is rotating divided by the duration of this rotation). In practice, the average power consumed by the motor is on the order of 1 W. Because the standby motor 74 has low-power and is only subject to a low load, the standby power supply 18 can be compact and inexpensive, as indicated above.

FIG. 5 shows the lock during mechanical lock release. Operating an internal or external release control causes the lever 48 to rotate. Because the end 78 of the finger is present between the bearing surface 54 of the lever 48 and the second bearing surface 44 of the pawl lifter 36, rotation of the lever 48 causes the pawl lifter 36 to rotate and release the claw 32; the movement of the pawl and claw assembly is similar to that described above and will not be discussed again in detail. Arrows 104 and 106 in FIG. 5 represent the rotary movement of the assembly comprising pawl lifter 36, the pawl 38 and claw 32. FIG. 5 also shows arrows 108 and 110 representing rotation of lever 48 under the action of an external or internal release control, causing rotation of the pawl assembly.

The lock of FIGS. 2 through 5 operates as follows. During normal operation, the lock is opened as explained with reference to FIGS. 2 and 3. In this case, when the release coupling lever 62 closes its corresponding contact, as explained above, to start the motor 58 and consequently release the lock.

Locking or release of the lock can be conducted solely by software. To ensure that the lock is locked, it is sufficient not to drive the motor 58 even when the contact of release coupling lever 62 is operated. Release of the lock is achieved by enabling the motor 58 to turn via the release coupling lever contact. Under normal operating conditions, a signal indicating release of the lock is delivered by the circuit 10 and simply transmitted to the main electronic circuit for the door, enabling software-controlled release of the lock.

Under degraded operating conditions, the lock operates as shown in FIG. 5, after coupling has been established between the emergency mechanical linkages, as shown in FIG. 4. The degraded operating mode may occur for various reasons, including, for example, failure of the electrical supply to the motor 58, failure of the motor 58 itself, or a detected emergency condition, such as an airbag or an ABS system deployment.

Under degraded operating conditions, the unlocking signal transmitted by circuit 10 commands the standby motor 74 for the lock to couple-in mechanical release of the lock as shown in FIG. 4. The unlocking mechanism is now formed from the arm 70, the standby motor 74 and the finger 76. As explained above, the motor 74 can be powered by a standby power supply 18, which ensures unlocking even if the main electrical system of the vehicle fails.

The lock of FIGS. 2–5 consequently allows, for example, software-controlled unlocking of the lock under normal operating conditions, and enabling the mechanical release of the lock even if the main power system of the vehicle should fail. Consequently, it is no longer necessary to provide a key-operated cylinder with the lock.

FIG. 6 shows another example of a lock usable in the system of FIG. 1. This lock is similar to the one in FIGS. 2–5, but instead of only providing a single coupling-in system for the external and internal release controls, a mechanical linkage is used for controlling release from inside the vehicle and an electrical linkage for controlling release from outside the vehicle. FIG. 6 is a diagrammatic view of the lock in a closed position with security locking in operation. The parts of the lock that are similar to those in FIG. 2 are indicated with same reference numerals and will not be described again. One will recognize the claw 32, lever 48, inner release cable or rod mechanism 52, pawl lifter 36, pawl 38, electric release motor 58 with its drive arm 112, arm 70, motor 74, coupling-in finger 76 and the guide member 80.

Unlike the lock of FIG. 2, the lock in FIG. 6 does not have a release coupling lever with the arm and lug. Consequently, the drive arm 112 of motor 58 bears directly on first bearing surface 42 of pawl lifter 36 when the motor 58 is operated. The shape of the drive arm 112 of the motor 58 is slightly different in FIG. 6 compared to FIG. 1 in view of the absence of the release coupling lever. More precisely, the arm 112 has a dimension in its displacement direction that is substantially equal to the sum of the dimensions of arm 60 and the release coupling lever 62. This avoids the need to modify the degree of travel of motor 58 to ensure release and makes it possible to employ, in the example of FIG. 6, the same motor as the motor used in the lock of FIG. 2.

Furthermore, the lock in this embodiment has no external release cable or rod mechanism 50. Structurally, the lever 48 is identical to the one shown in FIGS. 2–5, but it will be understood that the opening and the part designed to receive the external release cable can be dispensed with in this embodiment.

In the state shown in FIG. 6, the lock is closed with the security locking or child-proof feature in operation. Like in FIG. 2, the coupling-in finger 76 is raised and is no longer between the bearing surfaces 44 and 54 of the lever 48 and the pawl lifter 36.

When the lock is locked, attempts to open the lock using the internal release control causes the various parts of the lock to move in a fashion similar to the way shown in FIG. 3. The lever 48 is driven to rotate about the axis 40 by traction from the cable or rod mechanism 52, as shown in FIG. 3 by arrow 92. The bearing surface 54 of the lever 48 approaches the second bearing surface 44 of the pawl lifter 36. In view of the position of the coupling-in finger 76, the rotation of the lever 48 is not transmitted to the pawl lifter 36. Operation of the internal release control consequently does not lead to mechanical release of the lock because the mechanical release is disabled in this case. When the security locking or child-proof feature of the lock is in operation, electric release of the lock will also not be effective. In this case, any attempt to release the lock using the internal release control will not release the lock.

Mechanical release of the lock in FIG. 6 can be enabled. In this state, operating the internal release control mechanically releases the lock. Enablement of the mechanical release is achieved, as shown in FIG. 4, by lowering the finger 76 via the motor 74. The end 78 of the finger is positioned between the second bearing surface 44 of the pawl lifter 36 and the bearing surface 54 of the lever 48. In this state, when the internal release control is operated, it brings about rotation of the lever 48 about axis 40 via the cable or rod mechanism 52. The rotation of the lever 48 is transmitted to the pawl lifter 36 via the end 78 of the finger 76. Rotation of the pawl lifter 36 and the pawl 38 allows the claw 32 to turn in a similar manner as shown in FIG. 5.

This lock operates as follows. Release of the lock from the external release control is electric and is achieved via the motor 58 and the drive arm 112, causing the pawl lifter 36 to turn. No cable or rod mechanism going to the lever is provided in this embodiment. In this way, it is not necessary to fit the vehicle door with an external release control or a lock cylinder for introducing a key. If needed, power supply redundancy may be employed along with redundancy of the sensor or software to further ensure reliability of lock release. Locking and unlocking of the lock are purely software operations in this case and do not involve any mechanical elements.

Lock release from the internal release control is conducted mechanically. In the locked state or with the security locking or child-proof feature in operation, the finger 76 is in the raised position shown in FIG. 6. Operating the internal release control shifts lever 48 but has no effect on the pawl 38 and pawl lifter 36. When the lock is unlocked and if the child-proof feature is not in operation, the finger 76 is in the lower position. Operating the finger 76 acts on the pawl lifter 38 and pawl 38 to release the lock.

Lowering the coupling-in finger 76 has the effect of releasing the security locking feature or de-activating the child-proof feature of the lock. As a result, the lock has a purely electrical external release feature and a purely mechanical internal release feature, with a mechanical release that can be enabled to provide security locking or set the child-proof feature. Like in the example of FIGS. 2–5, the lock in FIG. 6 reduces problems caused by diverse lock models and it eliminates the need for a standby power supply in the door. The lock of FIG. 6 also makes it possible to simplify the door structure because no mechanical linkages between the external release control and the lock are required. External release control members can even be eliminated by using sensors other than the external release control sensor described in the example.

In the example shown in FIG. 6, the unlocking signal sent by the interrogating circuit 10 for the portable object 2 consequently brings about software unlocking, allowing electrical release of the lock. The portable object can, for example, be triggered when the user approaches the vehicle or manipulates the external release control. The unlocking signal further enables mechanical release of the lock from the internal release control. In other words, the mechanical unlocking system formed by the motor 74, the arm 70 and the finger 76 is operated to allow mechanical release of the lock from the internal release control.

Like in the example shown in FIGS. 2–5, the lock shown in FIG. 6 reduces the problems caused by diverse lock models and limits the need for a standby power supply in the door. It also allows the door structure to be simplified because the door structure no longer needs to accommodate mechanical linkages between an external release control and the lock. The invention can also dispense with external release control members by using sensors other than the sensor for external release control. Alternative embodiments can be provided; thus, for a door implementing a child-proof feature, the unlocking signal may not bring about enabling of mechanical release from the internal release control. This ensures that the door having the child-proof feature set will remain in this state even when the interrogating circuit is issuing an unlocking signal.

For the lock in FIG. 6, it is advantageous for the finger 76 to be located between the bearing surfaces 44 and 54 in the rest position. This avoids the need to provide a standby power supply for the motor 74 in the vehicle door. Indeed, if the security locking release finger 76 is in the upper position in its rest state, it is preferable to provide a standby power source, such as a battery, capacitor, or similar energy storage device in the door of the vehicle to enable the mechanical release even in post-impact conditions. Conversely, if the security locking release finger 76 is in the rest state in its lowered position, it is possible to implement security locking of the lock or a child-proof feature as soon as the vehicle starts, without providing a standby power source. For this, it is sufficient to raise the security locking release finger 76 using the vehicle battery. If the security locking release finger 76 is always left in the lower position on the driver's door, in other words, if security locking of the driver's door is not allowed, there always remains one door that can be opened via the internal release control, even in the case of an accident.

An alternative to the embodiment shown in FIG. 6 is a modification of the embodiment shown in FIGS. 2–5. In this alternative embodiment, one could provide, in the example of FIGS. 2–5, electrical release via motor 58, which is initiated by movement of the internal release control or movement of the lever. In this case, the effect of operating the internal release control would be to initiate electrical release. This solution provides electrical release of the lock from the internal release control. This embodiment requires the presence of a standby power source for lowering security locking release finger 76 if the electrical release fails to allow the lock to be opened mechanically at least via the internal release control, but such a power supply is already provided for the interrogating circuit. Thus, if electrical release from the internal release control is provided, the unlocking signal sent from the interrogating circuit also has the effect, for the internal release control, of enabling rotation of a motor 58. This does not cause finger 76 to descend.

Another alternative is to provide electrically-assisted release from the internal release control. In this case, when locking is released in the absence of security locking or the child-proof feature, the security locking release finger 76 is in a lower position. Operating the internal release control shifts the lever and initiates lock release via the motor. This solution has the disadvantage of mechanically-assisted release and, in particular, the risks accompanying rough operation of the internal release control. However, it also avoids the need to provide a standby power source in the door and allows a very low-powered motor 74 to be used for operating security locking release finger 76. In this case, the unlocking signal sent from the interrogating circuit authorizes operation of the motor 58 when the internal release control is operated, but additionally causes the finger 76 to descend.

Another problem with currently known locks is the diversity of lock models. In effect, a key cylinder is generally only provided on the front doors, but not on the rear doors of a vehicle. The use of the system in FIG. 1 can reduce this diversity by eliminating the need to provide a mechanical key locking cylinder.

In all of the examples described, a standby power supply can be provided as indicated above to power the vehicle's interrogating circuit and/or coupling in of the mechanical release of the lock. In the presence of such a standby power supply, one can cause mechanical release to be enabled even if the vehicle power supply fails, thereby allowing mechanical release of the lock either via the external release control and the internal release control (in the example of FIGS. 2–5), or via the internal release control (in the example of FIG. 6). In all cases, the energy required is small because the only actions required to be powered is the coupling in of the mechanical release and not actual release of the lock. If enablement of the mechanical release via the standby power supply is thus possible, sensors on the internal opening control or external opening control can be used for waking up the interrogating circuit electronics or the electronic circuitry associated with the lock if the main power supply of the vehicle fails.

Standby electronic circuitry can also be provided. The standby electronic circuitry should consume minimal power and have only a limited number of functions, including enabling the mechanical release. The standby electronic circuitry has a signal line to the vehicle battery or at the least receives a signal representing the presence of powering from the main vehicle battery. Further, the standby electronic circuitry is powered by the standby power supply and is capable of monitoring sensor status on the internal opening control or external opening control, or receive signals that represent the state of these sensors. The standby electronic circuitry is inactive as long as the vehicle battery is supplying power. If the vehicle battery ceases to provide a supply voltage, the standby electronic circuitry will be woken up by signals originating from the sensor to allow enabling of the mechanical release. Waking up of the standby circuitry by signals from the sensors ensures that the standby electronic circuitry will not consume power from the standby power source under normal operating conditions. The standby electronic circuitry can then be built into a circuit board that includes the standby power supply. The standby electronic circuitry will now include a logic circuit adapted to analyse signals received from the sensors and a changeover switch able to power up coupling-in of mechanical release from the standby power supply.

Obviously, the invention is not limited to the embodiments described by way of example. In particular, portable objects other than a transponder can be used; the above description does not exclude implementations in which the functions are implemented differently. The examples mention electric motors for providing unlocking via a signal supplied by the interrogating circuit, but other types of actuator could be used for unlocking, such as pneumatic actuators.

The various circuits or software for controlling the lock are not described in detail; they can be provided by those skilled in the art, using components known in the state-of-the-art.

In the examples described above, the invention has been described in its application to unlocking of a door; it can apply more generally to all opening components of a vehicle, including the vehicle trunk. The examples described above cover the simplest case in which the interrogating circuit supplies an unlocking signal to the lock of a door of the vehicle. It is also possible for the interrogating circuit to supply an unlocking signal to more than one lock, for example all the locks of the vehicle under normal operating conditions.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system for unlocking a key cylinderless vehicle closure, the system comprising:

an electric lock with an electrical release and a mechanical release, wherein the mechanical release can be enabled and disabled;

a selective coupling mechanism that enables the mechanical release of the electric lock if the electric lock fails;

a portable object having an object identification;

an interrogating circuit that powers and interrogates the portable object, wherein the interrogating circuit includes a control logic that controls operation of the electric lock, the control logic sends a control signal to the electric lock authorizing the electric lock to be unlocked based on the object identification, and the control signal is sent to the selective coupling mechanism in conditions of power supply failure to enable the mechanical release of the electric lock based on the object identification; and a power supply that supplies power to the interrogating circuit.

2. The system of claim 1, wherein the control logic supplies a software unlocking signal to the electric lock in normal operating conditions to electrically release the electric lock.

3. The system of claim 1, wherein the portable object has a first set of contacts and the interrogating circuit has a second set of contacts, wherein the first set of contacts and the second set of contacts are adapted to be coupled to each other.

4. The system of claim 1, further comprising a standby power supply.

5. The system of claim 4, wherein the interrogating circuit is powered by the standby power supply.

6. The system of claim 4, further comprising standby electronic circuitry powered by the standby power supply and adapted to enable the mechanical release with the electric lock.

7. The system of claim 6, further including a sensor, wherein the standby electronic circuitry has a low-power mode that terminates upon reception of a signal that corresponds to the sensor detecting operation of an inner lock release control or an external lock release control.

8. The system of claim 1, further comprising an unlocking mechanism that is responsive to an unlocking signal originating from the control logic.

9. The system of claim 8, wherein the mechanical release is enabled by operating the unlocking mechanism.

10. The system of claim 8, wherein the unlocking mechanism comprises an electric motor having electric power no greater than 10 W.

11. The system of claim 8, further comprising a main power supply of a vehicle and a standby power supply separate from the main power supply of the vehicle.

12. The system of claim 11, wherein the unlocking mechanism is powered by the standby power supply.

13. The system of claim 1, wherein the mechanical release only controls release from inside a vehicle.

14. The system of claim 1, wherein the portable object is a card.

15. A system for unlocking a key cylinderless vehicle closure, the system comprising:

an electric lock with an electrical release and a mechanical release, wherein the mechanical release can be enabled and disabled;

a selective coupling mechanism that enables the mechanical release of the electric lock if the electric lock fails;

a portable object having an object identification;

an interrogating circuit that powers and interrogates the portable object, wherein the interrogating circuit powers the portable object remotely when interrogating the portable object, wherein the interrogating circuit includes a control logic that controls operation of the electric lock, the control logic sends a control signal to the electric lock authorizing the electric lock to be unlocked based on the object identification, and the control signal is sent to the selective coupling mechanism in conditions of power supply failure to enable the mechanical release of the electric lock based on the object identification; and a power supply that supplies power to the interrogating circuit.

16. A key cylinderless vehicle closure, comprising:

an electric lock with an electrical release and a mechanical release, wherein the mechanical release can be enabled and disabled;

a selective coupling mechanism that enables the mechanical release of the electric lock if the electric lock fails;

an interrogating circuit that interrogates a portable object disposed outside the key cylinderless vehicle closure, wherein the interrogating circuit includes a control logic that sends a control signal to the electric lock authorizing the electric lock to be unlocked based on an object identification in the portable object and the control signal is sent to the selective coupling mechanism in conditions of power supply failure to enable the mechanical release of the electric lock based on the object identification in the portable object; and a power supply that supplies power to the interrogating circuit.

17. The vehicle closure of claim 16, wherein the control logic supplies a software unlocking signal to the electric lock in normal operating conditions to electrically release the electric lock.

18. The vehicle closure of claim 16, further comprising a main power supply of a vehicle and a standby power supply separate from the main power supply of the vehicle, wherein the interrogating circuit is powered by the standby power supply.

19. The vehicle closure of claim 18, further comprising a sensor and standby electronic circuitry powered by the standby power supply and adapted to enable the mechanical release with the electric lock, wherein the standby electronic circuitry has a low-power mode that terminates upon reception of a signal that corresponds to the sensor detecting operation of an inner lock release control or an external lock release control.

20. A vehicle with a key cylinderless closure, the vehicle comprising:

an electric lock including an electrical release and a mechanical release, wherein the mechanical release can be enabled and disabled;

a selective coupling mechanism that enables the mechanical release of the electric lock if the electric lock fails;

an interrogating circuit that powers and interrogates a portable object disposed outside the vehicle, wherein the interrogating circuit includes a control logic that sends a control signal to the electric lock authorizing the electric lock to be unlocked based on an object identification in the portable object and the control signal is sent to the selective coupling mechanism in conditions of power supply failure to enable the mechanical release of the electric lock based on the object identification; and a power supply that supplies power to the interrogating circuit.

* * * * *

UNITED STATES PATENT AND TRADEMARK OFFICE

CERTIFICATE OF CORRECTION

PATENT NO. : 7,224,259 B2
APPLICATION NO. : 10/365714
DATED : May 29, 2007
INVENTOR(S) : Belmond et al.

It is certified that error appears in the above-identified patent and that said Letters Patent is hereby corrected as shown below:

ON THE TITLE PAGE:

Please add the additional inventors:

Item
(75) Emmanuel Huber, Chateauneuf Sur Loire (FR)
Francois Paul Meurou, Sceaux Du Gatinais (FR)
Marc Andre Riss, Chateauneuf Sur Loire (FR)

Signed and Sealed this

First Day of April, 2008

JON W. DUDAS
*Director of the United States Patent and Trademark Office*